United States Patent

[11] 3,578,869

[72] Inventors Max J. Irland
  Dearborn;
  Victor L. Lindberg, Northville, Mich.
[21] Appl. No. 865,338
[22] Filed Oct. 10, 1969
[45] Patented May 18, 1971
[73] Assignee Ford Motor Company
  Dearborn, Mich.
  Continuation-in-part of application Ser. No. 601,437, Dec. 13, 1966, now abandoned.

[54] METHOD FOR DETECTING AND INDICATING WEDGE IN GLASS
  4 Claims, 3 Drawing Figs.
[52] U.S. Cl. ................................................ 356/239, 250/219
[51] Int. Cl. ................................................ G01n 21/32
[50] Field of Search ........................................ 356/239, 120, 161; 250/219 (DF), 219 (TH)

[56] References Cited
  UNITED STATES PATENTS
  2,429,066  10/1947  Kuchni .................... 356/161

3,081,665  3/1963  Griss et al. .................... 356/120

Primary Examiner—Ronald L. Wibert
Assistant Examiner—Orville B. Chew, II
Attorneys—John R. Faulkner and William E. Johnson ABSTRACT: A method of measuring wedge in a glass sheet has the following steps. A beam of parallel light rays is projected through the glass sheet. The beam is reflected through the glass sheet and passes through an adjustable correction device. The correction device controls the direction of further projection of the reflected beam depending on the relative position of the device. The reflected beam is split along an axis into at least two separate beams which, in turn, are projected onto separate light-measuring devices. The light-measuring devices produce a signal corresponding to the intensity of the beams projected thereon. The adjustable correction device is repositioned to a position which causes a prescribed relationship to be established in the signals developed by the light-measuring devices. The position of the correction device indicates the direction and degree of wedge in the glass sheet.

PATENTED MAY 18 1971
3,578,869
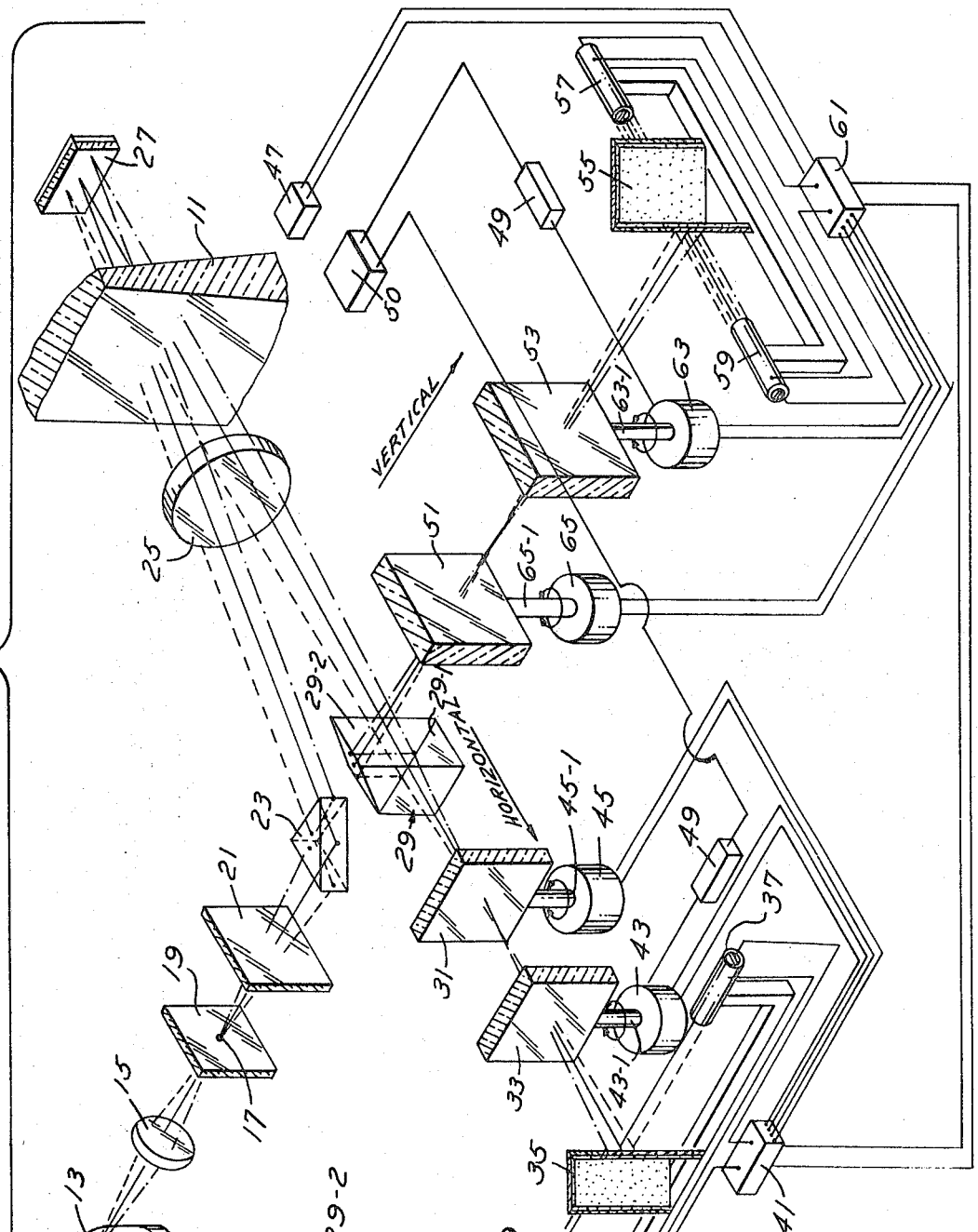
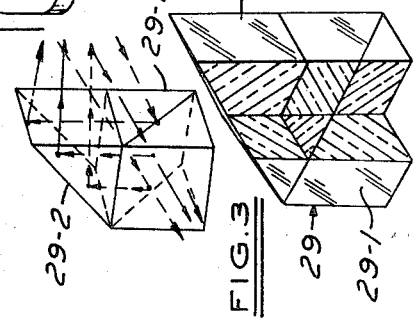
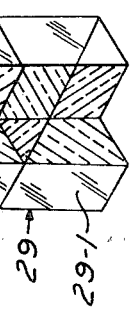
MAX J. IRLAND
VICTOR L. LINDBERG
INVENTORS
BY John R. Faulkner
William E. Johnson
ATTORNEYS

METHOD FOR DETECTING AND INDICATING WEDGE IN GLASS

This application is a continuation-in-part of our application Ser. No. 601,437 filed Dec. 13, 1966, abandoned.

BACKGROUND AND SUMMARY OF THE INVENTION

This invention relates to a method for inspecting glass sheets for wedge defects that may or may not be readily apparent to an unaided eye. In particular, this invention relates to a method for detecting, measuring and indicating the existence and characterization of wedge in glass sheets.

Wedge is the departure from parallelism between glass surfaces. When a glass sheet contains wedge, any object viewed through the area of wedge is distorted in shape and its apparent position does not coincide exactly with its actual position.

In general terms, the method of this invention comprises providing a restricted or point source of light, projecting said light through a collimating lens which converts said light to a plurality of parallel beams of light and through the glass undergoing test to a mirror. The light beams reaching the mirror are reflected by the mirror back through the glass undergoing test and through said lens to a light divider which divides the now converging reflected light into a first portion and a second portion. Each such portion is directed through a pair of glass compensating plates to a roof reflector which divides the portion into predetermined subportions and diverts the resultant subportions to a pair of photocells. The roof reflectors may be positioned in a manner such that bisecting planes passing through their roof lines form an angle of 90°. With the reflectors in this or optically equivalent alignment for light reception, one such portion is utilized to measure the horizontal component of wedge while the other portion is utilized to measure the vertical component of wedge. Each of the photocells are components of detection systems which are preset in a manner such that when glass without wedge is under inspection the light received by these photocells maintains such system in balance. Preferably such balance is obtained when the light is divided equally between such photocells. When wedge of the type that causes horizontal deviation of light rays passing therethrough is present in the glass undergoing test, the deviation of light beams passing therethrough causes an uneven distribution of light to the corresponding pair of photocells creating an imbalance in the detection and correction system of which these photocells are components. This imbalance automatically activates a balancing circuit which rotates one of the associated compensating plates until the light passing to the associated photocells is returned to present balance conditions for parallel glass. When vertical wedge is present in the glass undergoing test, the same procedure is effected by the other portion of the beam issuing from the aforesaid light divider. The movement required to restore balance in each of the detection units is measured both directionally and quantitatively and such measures utilized as a measure of the pertinent component of wedge. The readings obtained from such measurement may be utilized to signal and record the existence and characterization of wedge, mark the location and characterization of wedge on the glass, etc.

Other methods of inspecting glass which utilize some of the steps included in the method of this invention are disclosed by Keuhni in U.S. Pat. No. 2,429,066; McMaster et al. in U.S. Pat. No. 2,735,331; Gunther et al. in U.S. Pat. No. 3,137,756; and Galey et al. in U.S. Pat. No. 3,202,043.

The principal object of this invention is to provide a method for inspecting glass sheets and automatically indicating the existence and characterization of wedge therein.

BRIEF DESCRIPTION OF THE DRAWINGS

More specific objects and advantages will be apparent from the following detailed description when read in conjunction with the accompanying drawing, wherein:

FIG. 1 is an assembly view of one embodiment of test apparatus which may be used to carry out the method of this invention;

FIG. 2 is a perspective view of the light divider of FIG. 1 viewed at an angle from the direction of view in FIG. 1; and FIG. 3 is a cutaway section of the prism shown in FIG. 2.

DESCRIPTION OF THE PREFERRED EMBODIMENT

Referring now to the drawing, particularly to FIG. 1, a sheet of glass 11 is shown in position for testing. A light source 13, e.g. an incandescent lamp, carbon arc, mercury arc, laser, etc., is shown in the upper left of the assembly. A portion of the light from light source 13 passes through lens 15 and is focused to pass through pinhole 17 in plate 19. The light beam emerging from pinhole 17 next passes through filter 21, a sheet of colored glass that filters out light of unneeded wave length. Such filters are commercially available and the filter employed here is chosen to match the color sensitivity of the photoreceivers hereinafter mentioned, i.e. the filter permits transmission therethrough of light of wave length which is efficiently received by the photoreceivers utilized to detect and assist in measuring wedge. After passing through filter 21, this light beam passes through a prism 23 which turns the light beam 90° and directs the light beam to collimating lens 25, e.g. an achromat. It will be understood that a properly positioned mirror can be substituted for prism 23. The light beam upon passing through collimating lens 25 is converted to a plurality of parallel rays. The lens employed for collimating in this embodiment had a focal length of about 26 inches. The resultant parallel rays pass through the glass 11 and in such passage undergo angle deviation proportional to the degree of wedge and strike a flat mirror 27.

Lens 25 and mirror 27 are positioned in parallel relationship with respect to each other and as closely as possible to parallel relationship with glass 11 when it is moved into test position between lens 25 and mirror 27.

The pinhole 17 from which the utilized light emerges is positioned from such pinhole and being projected to lens 25 travels a distance between such pinhole and such lens that is essentially equal to the focal length of the collimating lens. Within reason, the size of pinhole 17 is not critical. In this embodiment, the diameter of pinhole 17 was approximately one-sixteenth inch. A point source of light providing parallel rays can also be obtained by directing a laser beam through a positive lens. The sensitivity of the method for detecting wedge is inversely proportional to the size of the pinhole and directly proportional to the size and quality of collimating lens.

The area of test is advisedly smaller than the least distance between significant changes in wedge angle. What constitutes a significant change in wedge angle is dependent upon the tolerance admissible for the end use. For glass intended for employment that would merit such checking, significant change would be a change in wedge angle in the range of about 20 seconds of arc to about 2 minutes of arc. The instant embodiment as here illustrated was designed to detect changes in wedge angle of about 1 minute arc.

Mirror 27 may be either a front surface mirror or a back surface mirror. It is preferably smaller than the collimating lens 25. The smaller of the two limits the area of inspection. The light passing through glass 11 and striking mirror 27 is reflected back through glass 11 at essentially the same spot as that of its first passage and in return passage is again deviated in proportion to the degree of wedge at such point. After passing through glass 11, the reflected beam passes through collimating lens 25 and converges toward light divider or beam-splitting means 29 which is situated in front of the focal point of such lens. Light divider 29 is more fully illustrated in FIGS. 2 and 3 and here comprises a beam splitting cube 29–1 formed of a pair of matched prisms and a right-angle prism 29–2. The reflected beam is divided by light divider 29 into two portions which preferably are quantitatively equal. A first portion of this beam passes directly through light divider 29 and thence through compensating plate 31 and compensating plate or adjustable correction device 33 to roof reflector 35. Compensator plate 31 and correction device 33 are plane-parallel, transparent sheets, e.g. glass.

After passing through correction device 33, the now diverging first portion beam strikes roof reflector 35 and is divided into two subportions or subbeams which are respectively diverted to photocells 37 and 39. Roof reflector 35 is here rigidly mounted and positioned to equally divide such first beam portion when the glass under measurement is without wedge. Photocells 37 and 39 and the associated circuitry are preset to receive an equal quantity of light when the glass under measurement is without wedge. When glass containing wedge of the type which would cause horizontal deviation of light is in test position between lens 25 and mirror 27, the cone of light falling on roof 35 will be displaced in such a manner that there will be an imbalance in reflected light received by photocells 37 and 39. In operative electrical connection with photocells 37 and 39 is a power unit 41 which includes a battery, a bridge circuit, and an amplifier. Power unit 41, in turn, is in operative electrical connection with servomotor 43 and with servomotor 45. Servomotors 43 and 45 are respectively operatively connected to compensator or correction device 33 and compensator 31 via shafts 43–1 and 45–1.

When an imbalance occurs in the reflected light received by photocells 37 and 39, it produces an imbalance in the bridge circuit in electrical connection with such cells causing an electrical signal to be transmitted to the associated amplifier. This signal is amplified and then actuates servomotor 43 with resultant rotation of shaft 43–1 and compensator or correction device 33.

The rotation of correction device 33 is in a direction such as to displace the first, or horizontal deviation indicating, portion of the beam to its original position thereby restoring balance to the aforementioned bridge circuit. The amount and direction of rotation required to return the reception of light on reflector 35 to balance is a measure of the horizontal component of the wedge. Measurement of the direction and amount of rotation may be made by any suitable means such as recorder and indicator means 49 and such measurement recorded. This measurement can be utilized to actuate any desired type of signal device and to actuate marking means 50 which will mark the glass passing through the test area at the location of the wedge. The recording may be synchronized with movement of the glass under test through the test area and such markings affixed after the glass has moved through the test area.

Returning to the light divider 29, the remainder of the beam which is identical in composition to that portion passing directly through divider 29 is reflected in an upward direction by beam-splitting cube 29–1 striking the reflecting face of prism 29–2 which causes a 90° rotation of the beam about its longitudinal axis. This second portion of the beam is utilized in identical manner to detect, measure and characterize the vertical component of wedge. This second, or vertical deviation indicating, portion of the beam is thence directed horizontally and at a 90° angle from the first, or horizontal deviation indicating, portion.

The second portion of the beam after leaving light divider 29 passes through compensator 51 and compensator or adjustable correction device 53 and falls upon the reflecting surfaces of roof reflector 55. Compensator 51 and adjustable correction device 53 are identical to compensator 31 and adjustable correction device 33. This portion of the beam is divided into subbeams by reflectors 55 and directed to photocells 57 and 59. A plane passing passing through the roof line of reflector 55 and bisecting the roof angle of 55 forms a 90° angle with a plane passing through the roof line of reflector 35 and bisecting the roof angle of 35. Cells 57 and 59 are in operative electrical connection with power unit 61 which includes a battery, a bridge circuit and an amplifier. Power unit 61, in turn, is in operative electrical connection with servomotors 63 and 65. Servomotors 63 and 65 are operatively connected via shafts 63–1 and 65–1 to compensator 51 and adjustable correction device 53. This unit is operated in identical manner with the apparatus 49 and 50 associated with detection, measurement and characterization of the horizontal component of wedge. Utilization of such measurement is likewise the same.

Compensators 31 and 51 may also be referred to as zero compensators. When there is no glass in the test area, compensators 31 and 51 are rotated, when necessary, to adjust the beams issuing from light divider 29 and striking reflectors 35 and 55 to positions which respectively reestablish an equal distribution of the reflected light between the photocells associated with reflectors 35 and 55. The absence of glass in the test area is detected by detection means 47, e.g. photodetection means, and the resultant signal is transmitted to power unit 61 which is in electrical connection with power unit 41. The transmission of such signal to power units 41 and 61 effects actuation of servomotors 45 and 65 and the turning of zero compensators 31 and 51 via shafts 45–1 and 65–1 if the corresponding bridge is in a state of imbalance.

In another embodiment, the roof reflectors 35 and 55 and light divider 29 are replaced by a pyramid reflector with four associated photocells serving the same functions as the reflectors and photocells of the illustrated embodiment previously described. In this embodiment, the pyramid reflector is positioned to reflect a given quantity of light to each of the four photocells when the glass under test is without wedge. This embodiment also includes a pair of transparent, plane-parallel compensating plates or adjustable correction devices between the pyramid reflector and the mirror corresponding to mirror 27 of the drawing in the line of reflection. One such compensating plate or adjustable correction device is rotated about a horizontal axis to rebalance distribution and measure vertical wedge. Another rotates about a vertical axis to rebalance reflection distribution and measure horizontal wedge.

The term "horizontal wedge" as employed herein refers to wedge formed by two planes whose projections intersect in a vertical line. Such wedge in a glass sheet will produce horizontal deviation of a light ray approaching said sheet normal to its face and passing through the area of wedge.

The term "vertical wedge" as employed herein refers to wedge formed by two planes whose projections intersect in a horizontal line. Such wedge in a glass sheet will produce vertical deviation of a light ray approaching said sheet normal to its face and passing through the area of wedge.

I claim:

1. A method of measuring wedge in a glass sheet which comprises:
   generating a beam of parallel light rays;
   projecting said beam through said glass sheet;
   reflecting said projected beam back through said glass sheet;
   passing said reflected beam through a pair of adjustable correction devices, each of said devices controlling the direction of further projection of said reflected beam along selected axes depending on the reflected beam along selected axes depending on the relative positions of said devices;
   separating said projected beam into at least four subbeams, two of said subbeams being representative of the light intensity along one axis of said reflected beam and two of said subbeams being representative of the light intensity along a second axis of said reflected beam, said first and said second axes being respectively aligned with the selected axes along which said adjustable control devices control the projection of said reflected beam;
   projecting said first two subbeams onto separate light measuring devices which produce a signal corresponding to the intensity of the beam projected thereon;
   moving said adjustable correction device controlling the projection of light along said first axis to a position which causes a prescribed relationship to be established in the signals developed by said light-measuring devices measuring said first two subbeams;

projecting said second two subbeams onto separate light measuring devices which produce a signal corresponding to the intensity of the beam projected thereon; and repositioning said adjustable correction device controlling the projection of light along said second axis to a position which causes a prescribed relationship to be established in the signals developed by said light-measuring devices measuring said second two subbeams, whereby the position of said adjustable correction devices indicate the direction and degree of wedge in said glass sheet along said two axes.

2. A method of measuring wedge as defined in claim 1 wherein said reflected beam is separated into at least four subbeams by initially splitting said beam into first and second beam portions respectively representative of the light intensity along the first and the second axes of said reflected beam, passing said first and second beam portions through associated ones of said adjustable correction devices; and splitting said first and said second beam portions into said first subbeams and into said second subbeams.

3. The method of claim 2 wherein said first and said second axes of said reflected beam are perpendicular to one another.

4. The method of claim 3 wherein said first and said second axes of said reflected beam are the horizontal and the vertical axes.